US012766672B2

(12) United States Patent
Shi et al.

(10) Patent No.: US 12,766,672 B2
(45) Date of Patent: Oct. 20, 2026

(54) ASSEMBLY JIG

(71) Applicants: Beijing BOE Chatani Electronics Co., Ltd., Beijing (CN); BOE Technology Group Co., Ltd., Beijing (CN)

(72) Inventors: Qianqian Shi, Beijing (CN); Qilin Li, Beijing (CN)

(73) Assignees: BEIJING BOE CHATANI ELECTRONICS CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 311 days.

(21) Appl. No.: 18/294,180

(22) PCT Filed: Mar. 29, 2022

(86) PCT No.: PCT/CN2022/083656
§ 371 (c)(1),
(2) Date: Feb. 1, 2024

(87) PCT Pub. No.: WO2023/184148
PCT Pub. Date: Oct. 5, 2023

(65) Prior Publication Data

US 2024/0342867 A1 Oct. 17, 2024

(51) Int. Cl.
*B25B 11/02* (2006.01)

(52) U.S. Cl.
CPC .................................... *B25B 11/02* (2013.01)

(58) Field of Classification Search
CPC .......... B25B 11/00; B25B 11/02; B23P 19/04; Y10T 29/53961; Y10T 29/5397
(Continued)

(56) References Cited

U.S. PATENT DOCUMENTS 6,354,581 B1 * 3/2002 Johnson ................. B23Q 3/186 269/910
7,269,901 B2 * 9/2007 Robin .................... B21D 53/74 269/291
9,165,739 B2 * 10/2015 Ueda ...................... H01J 9/241

FOREIGN PATENT DOCUMENTS

CN 203680970 U 7/2014
CN 106241673 A 12/2016
(Continued)

OTHER PUBLICATIONS

English Translation of CN 206351421 U. (Year: 2017).*
(Continued)

*Primary Examiner* — Jason L Vaughan
(74) *Attorney, Agent, or Firm* — XSENSUS LLP

(57) ABSTRACT

An assembly jig, comprises: a bearing platform, having a bearing area, a first limiting surface, a second limiting surface, and a plurality of adsorption holes penetrating the bearing area, wherein the first limiting surface is located on a side of the bearing area along a first direction, the second limiting surface is located on a side of the bearing area along a second direction, and the first direction intersects with the second direction; an adsorption component, being in communication with the plurality of adsorption holes and configured to form a negative pressure in the adsorption holes; a guide rail, limited on the bearing platform and provided on a side where the bearing area is located, wherein a length direction of the guide rail is parallel to the second direction; and a press component, slidably limited on the guide rail and having a press surface towards the bearing area.

20 Claims, 5 Drawing Sheets

(58) Field of Classification Search
USPC .................. 100/226, 229 R; 29/281.1, 281.3
See application file for complete search history.

(56) References Cited

FOREIGN PATENT DOCUMENTS

| | | | |
|---|---|---|---|
| CN | 106402807 | A | 2/2017 |
| CN | 206351421 | U | 7/2017 |
| CN | 208399861 | U | 1/2019 |
| CN | 211786466 | U | 10/2020 |
| JP | 2014113223 | A | 6/2014 |
| WO | 2018232711 | A1 | 12/2018 |

OTHER PUBLICATIONS

CN 206351421 U—English Translation (Year: 2017).*
International Search Report and Written Opinion mailed on Dec. 15, 2022, in corresponding PCT/CN2022/083656, 11 pages.
Office Action issued Nov. 27, 2025 in Chinese Patent Application No. 2022800005987, 18 pages.

* cited by examiner

ASSEMBLY JIG

CROSS REFERENCE TO RELATED APPLICATION(S)

The present disclosure is a 35 U.S.C. 371 national phase application of PCT International Application No. PCT/CN2022/083656 filed on Mar. 29, 2022, the entire content of which is incorporated herein by reference.

TECHNICAL FIELD

The present disclosure relates to the technical field of device manufacture, and in particular, to an assembly jig.

BACKGROUND

As LCD technology matures, users have higher and higher quality requirements for LCD products. Taking LED liquid crystal display products as an example, users have increasingly higher requirements for the brightness uniformity of LED liquid crystal display products.

The display panel of the LED liquid crystal display product includes a backlight source and a backplane, and the backlight source includes an LED light bar and a light guide plate. In order to improve the brightness uniformity of LED liquid crystal display products, it is proposed to assemble the LED light bar and the light guide plate first, and then assemble the assembled structural parts and the backplane. However, the product yield after assembly using the current assembly process is low, and the assembly efficiency is slow.

It should be noted that the information disclosed in the background section is only used to enhance understanding of the background of the present disclosure, and therefore may include information that does not constitute prior art known to those of ordinary skills in the art.

SUMMARY

The purpose of the present disclosure is to provide an assembly jig.

According to an aspect of the present disclosure, an assembly jig is provided, including:

- a bearing platform, having a bearing area, a first limiting surface, a second limiting surface, and a plurality of adsorption holes penetrating the bearing area, where the first limiting surface is located on a side of the bearing area along the first direction, the second limiting surface is located on a side of the bearing area along the second direction, and the first direction intersects with the second direction;
- an adsorption component, being in communication with the plurality of adsorption holes and configured to form a negative pressure in the adsorption holes;
- a guide rail, limited on the bearing platform and provided on a side where the bearing area is located, where the length direction of the guide rail is parallel to the second direction; and
- a press component, slidably limited on the guide rail and having a press surface towards the bearing area, where when the press component slides, the orthographic projection of the press surface on the bearing platform is located in the bearing area, and a gap exits between the press surface and the surface of the bearing area.

According to the assembly jig provided in any embodiment of the present disclosure, the bearing platform includes a platform body and a first limiting structure.

The first limiting structure is limited on a side of the bearing area along the first direction, and the first limiting structure has the first limiting surface.

According to the assembly jig provided in any embodiment of the disclosure, the platform body has a first slide groove extending along the second direction, and the bearing platform further includes a first limiting rod.

One end of the first limiting rod passes through the first slide groove and is in a limiting connection with the first limiting structure. The other end of the first limiting rod is detachably limited on the side of the platform body away from the first limiting structure.

According to the assembly jig provided in any embodiment of the present disclosure, the first limiting structure has a second slide groove extending along the first direction, and the bearing platform further includes a second limiting rod.

One end of the second limiting rod passes through the second slide groove and is in a limiting connection with the platform body. The other end of the second limiting rod is detachably limited on the side of the first limiting structure away from the platform body.

According to the assembly jig provided in any embodiment of the present disclosure, the platform body has a groove extending to an edge, and the groove has a side wall perpendicular to the second direction.

The bottom surface of the groove forms the bearing area, and the side wall of the groove perpendicular to the second direction forms the second limiting surface.

According to the assembly jig provided in any embodiment of the present disclosure, the bearing platform further includes a second limiting structure.

The second limiting structure is limited on the platform body and is located on one side of the bearing area along the first direction. The second limiting structure has the second limiting surface.

According to the assembly jig provided in any embodiment of the present disclosure, the adsorption component includes a vacuum generator and a plurality of regulating valves.

The first end of each regulating valve is in communication with the suction end of the vacuum generator, and the second end of each regulating valve is in communication with at least one of the adsorption holes.

According to the assembly jig provided in any embodiment of the present disclosure, the assembly jig further includes a base, and the base has a plurality of air channels corresponding to the plurality of regulating valves in a one-to-one correspondence.

The base is located on the side of the bearing platform away from the bearing area. Each of the air channels is in communication with at least one of the adsorption holes. Each of the air channels is in communication with the second end of the respective regulating valve.

According to the assembly jig provided in any embodiment of the present disclosure, the press component includes a slide block, a connection block, and a press body.

The slide block is slidably limited on the guide rail, the connection block is in a limiting connection with the slide block, and the press body is limited on the connection block.

When the slide block slides, the orthographic projection of the press body on the bearing platform is located in the bearing area, and a gap exists between the press body and the surface of the bearing area.

According to the assembly jig provided in any embodiment of the present disclosure, the slide block has a limiting hole, and at least part of the connection block is limited in the limiting hole.

According to the assembly jig provided in any embodiment of the present disclosure, the press component includes an armrest, the armrest is fixedly connected to the slide block, and the connection block extends into the limiting hole and is fixedly connected to the armrest.

According to the assembly jig provided in any embodiment of the present disclosure, the connection block is detachably and fixedly connected to the slide block, and the assembly jig further includes a rotating block, a limiting block, a buckle, and a hook.

The bearing platform is provided with a support seat on a side of the bearing area, one end of the rotating block is rotatably limited on the support seat, and an end of the guide rail is fixed on the rotating block.

The limiting block is fixed on the bearing platform and is located on the side of the support seat close to the bearing area. The distance between the limiting block and the support seat is less than the length of the rotating block.

The buckle is fixed on the bearing platform, and the hook is fixed on the other end of the rotating block. When the rotating block is supported on the limiting block, the buckle is connected to the hook.

According to the assembly jigs provided in any embodiment of the present disclosure, the gap between the press body and the surface of the bearing area is adjustable.

According to the assembly jig provided in any embodiment of the present disclosure, the press component further includes an elastic member and a connection member.

Both ends of the connection member are threadedly connected to at least one of the slide block and the connection block respectively. The elastic member is clamped between the slide block and the connection block.

According to the assembly jig provided in any embodiment of the present disclosure, the press body is a press roller, and the press roller is rotatably limited on the connection block.

According to the assembly jig provided in any embodiment of the present disclosure, the press component includes a plurality of press rollers, and the plurality of press rollers are axially parallel and distributed along the length direction of the guide rail.

According to the assembly jig provided in any embodiment of the present disclosure, the bearing area is configured to carry the light bar, the first limiting surface and the second limiting surface are configured to limit two adjacent sides of the light bar, the adsorption component is configured to fix the light bar, and the press component is configured to press the light guide plate covering the light bar when sliding along the guide rail.

It should be understood that the foregoing general description and the following detailed description are exemplary and explanatory only, and do not limit the present disclosure.

BRIEF DESCRIPTION OF THE DRAWINGS

The accompanying drawings, which are incorporated in and constitute a part of this specification, illustrate embodiments consistent with the present disclosure and together with the description, serve to explain the principle of the present disclosure. It is noted that the drawings in the following description are only some embodiments of the present disclosure. For those of ordinary skills in the art, other drawings can be obtained based on these drawings without exerting creative efforts.

REFERENCE NUMERALS

Figure 1:
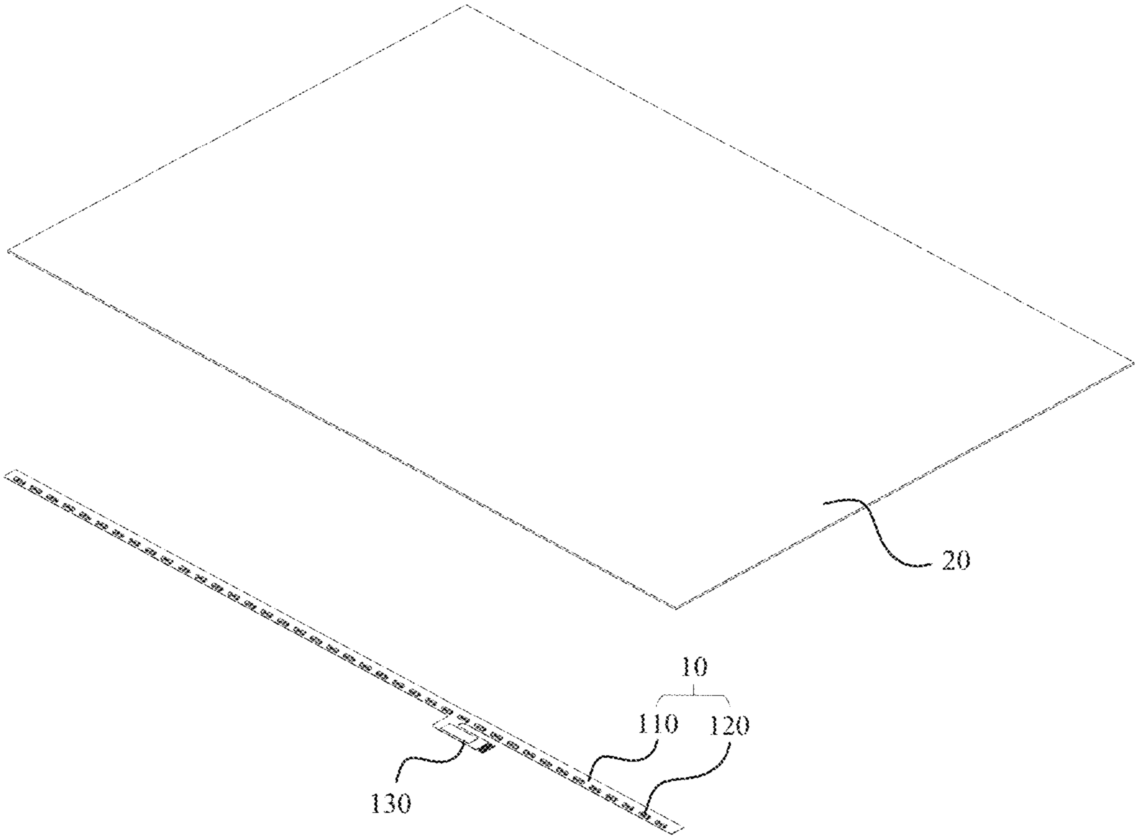
FIG. 1 is a schematic structural diagram of a light bar and a light guide plate to be assembled according to an embodiment of the present disclosure.

- 10. light bar; 20. light guide plate; 110. flexible circuit board; 120. light-emitting unit; 130. circuit connector;
- 1. bearing platform; 2. adsorption component; 3. guide rail; 4. press component; 5. base; 6. rotating block; 7. limiting block; 8. buckle; 9. hook;
- 101. bearing area; 102. first limiting surface; 103. second limiting surface; 104. adsorption hole; 105. support seat;
- 11. platform body; 12. first limiting structure;
- 111. groove; 112. first slide groove; 113. second avoidance groove;
- 121. second slide groove; 122. first avoidance groove;
- 21. vacuum generator; 22. air source switch;
- 41. slide block; 42. connection block; 43. press body; 44. armrest;
- 411. limiting hole;
- 51. air channel.

DETAILED DESCRIPTION OF THE EMBODIMENTS

Example embodiments will now be described more fully with reference to the accompanying drawings. Example embodiments may, however, be embodied in various forms, and should not be construed as limited to the embodiments set forth herein. Rather, these embodiments are provided so that the present disclosure will be thorough and complete, and will fully convey the concept of the example embodiments to those skilled in the art. The same reference numerals in the drawings indicate the same or similar structures, and thus their detailed descriptions will be omitted. Furthermore, the drawings are merely schematic illustrations of the present disclosure, and are not necessarily drawn to scale.

Although relative terms, such as "top" and "bottom" are used in this specification to describe the relative relationship of one component represented by an icon to another component, these terms are used in this specification only for convenience, for example, based on the example direction described according to the drawings. It will be understood that if the device represented by the icon were turned upside down, components described as being on "top" would become components as being at "bottom". When a structure is "on" another structure, it may mean that the structure is integrally formed on the other structure, or that the structure is "directly" placed on the other structure, or that the structure is "indirectly" placed on the other structure through an intermediate structure.

The terms "a", "an", "the", "said", and "at least one" are used to indicate the presence of one or more elements or components, etc. The terms "include" and "have" are used to indicate an open-ended inclusion, and mean that there may be additional elements or components, etc. in addition to those listed. The terms "first". "second", "third" etc. are only used as markers, not as any limitation on the number of the relevant objects.

Embodiments of the present disclosure provide an assembly jig used for assembling two components to be assembled. For example, the two components are the light bar 10 and the light guide plate 20 respectively. It is noted that the two components may also be other components to be assembled, which is not limited in the embodiments of the present disclosure.

As shown in FIG. 1, the light bar 10 generally includes a flexible circuit board 110 and a plurality of light-emitting units 120 (LED light-emitting units 120) bonded to one side of the flexible circuit board 110. The plurality of light-emitting units 120 are arranged in a row. The orientation of the light-emitting side of each light-emitting unit 120 is parallel to the plane where the flexible circuit board 110 is located. That is, the plurality of light-emitting units 120 are all emitting light in the same direction.

As shown in FIG. 1, the flexible circuit board 110 has a circuit connector 130, and the plurality of light-emitting units 120 bonded on the flexible circuit board 110 are used to electrically connect to external circuits through the circuit connector 130. The side of the flexible circuit board 110 bonded with the light-emitting units 120 is coated with an adhesive, so that the light guide plate 20 can be bonded onto the flexible circuit board 110 to achieve assembly of the light bar 10 and the light guide plate 20.

Figure 2:
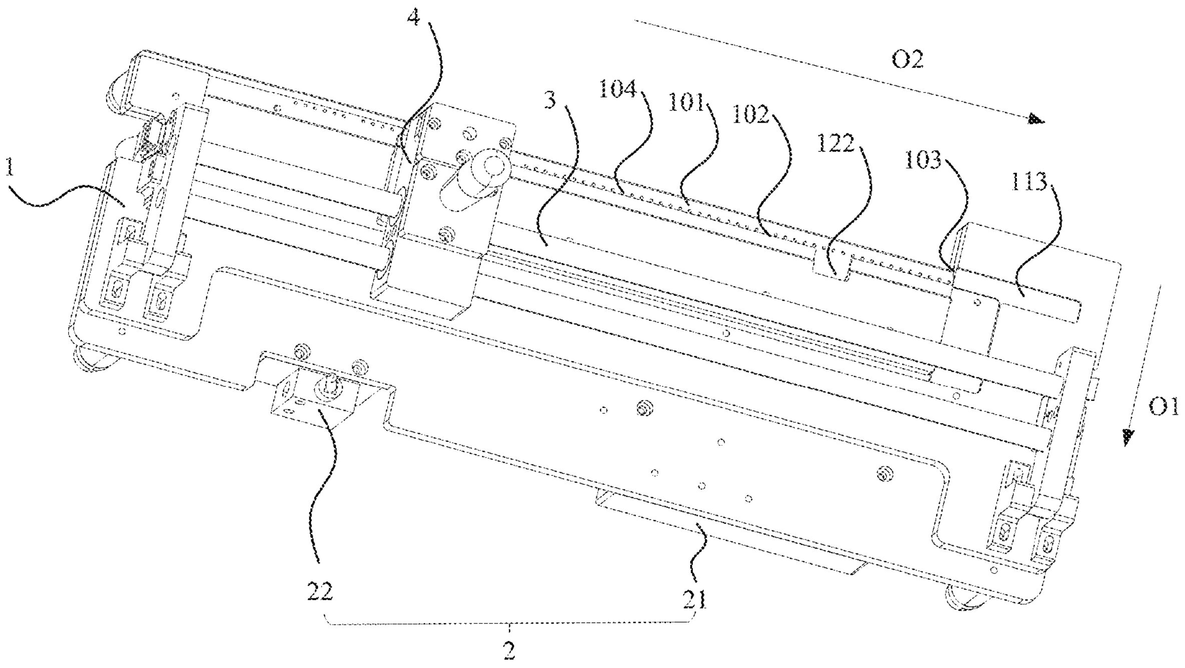
FIG. 2 is a schematic structural diagram of an assembly jig provided by an embodiment of the present disclosure.

As shown in FIG. 2, the assembly jig includes a bearing platform 1, an adsorption component 2, a guide rail 3, and a press component 4. The bearing platform 1 has a bearing area 101, a first limiting surface 102, a second limiting surface 103, and a plurality of adsorption holes 104 penetrating the bearing area 101. The first limiting surface 102 is located on the side of the bearing area 101 along the first direction O1. The second limiting surface 103 is located on the side of the bearing area 101 along the second direction O2. The first direction O1 intersects with the second direction O2. The adsorption component 2 is in communication with the plurality of adsorption holes 104, and is used to form a negative pressure in the adsorption holes 104. The guide rail 3 is limited on the bearing platform 1, and is provided on a side where the bearing area 101 is located. The length direction of the guide rail 3 is parallel to the second direction O2. The press component 4 is slidably limited on the guide rail 3. The press component 4 has a press surface facing the bearing area 101. When the press component 4 slides, the orthographic projection of the press surface on the bearing platform 1 is located in the bearing area, and there is a gap between the press surface and the surface of the bearing area 101.

In an embodiment of the present disclosure, the first component to be assembled and placed in the bearing area 101 can be positioned through the first limiting surface 102 and the second limiting surface 103, which simplifies the positioning operation and improves the positioning efficiency. The first component after positioning is fixed by the adsorption component 2 to ensure the stable fixation and avoid component displacement. Then, after the second component to be assembled covers the first component, the press component 4 can be promoted to slide along the guide rail 3, so as to press the first component and the second component together through the press surface of the press component 4, thereby realizing the assembly of the two components. In this way, the assembly jig can improve the assembly efficiency while ensuring the yield of the assembled product.

The bearing area 101 refers to the common area between the first area located on the side of the first limiting surface 102 and the second area located on the side of the second limiting surface 103. In this way, the outer contour of the bearing area 101 has a partial outline located in the first limiting surface 102, and a partial outline located in the second limiting surface 103.

The surface of the bearing area 101, the first limiting surface 102, and the second limiting surface 103 are all flat surfaces (this is not limited to a plane in the strict sense). The first limiting surface 102 and the second limiting surface 103 are both perpendicular to the surface of the bearing area 101. It is noted that the angle between the first limiting surface 102 or the second limiting surface 103 and the surface of the bearing area 101 can also be slightly less than 90 degrees, or slightly greater than 90 degrees. The present disclosure is not limited in this regard.

The first direction O1 and the second direction O2 are both parallel to the surface of the bearing area 101. The first direction O1 is perpendicular to the first limiting surface 102. The second direction O2 is perpendicular to the second limiting surface 103.

The first direction O1 is perpendicular to the second direction O2. In this way, the first limiting surface 102 is perpendicular to the second limiting surface 103, so that the first limiting surface 102 and the second limiting surface 103 facilitate positioning components with right-angle corners. It is noted that the angle between the first direction O1 and the second direction O2 may also be slightly less than 90 degrees or slightly greater than 90 degrees, as long as the first limiting surface 102 and the second limiting surface 103 can position the first component carried by the bearing area 101. The embodiments of the present disclosure are not limited in this regard.

The cross section of the guide rail 3 may be circular, elliptical, or rectangular. When the cross section of the guide rail 3 is circular, the assembly jig includes a plurality of mutually parallel guide rails 3. The planes where the plurality of guide rails 3 is located are parallel to the surface of the bearing area 101, so as to avoid rotation of the press component 4. For example, as shown in FIG. 2, the guide rail 3 has a circular cross section, and the assembly jig includes two mutually parallel guide rails 3. The guide rail 3 is directly limited on the bearing platform 1, or the bearing platform 1 is provided with a support seat 105 on a side of the bearing area 101, and the guide rail 3 is limited on the support seat 105. The embodiments of the present disclosure are not limited in this regard.

In actual uses, the assembly process of the light bar 10 and the light guide plate 20 is taken as an example. The light bar 10 is placed in the bearing area 101 of the bearing platform 1. That is, the bearing area 101 is used to carry the light bar 10. The first limiting surface 102 and the second limiting surface 103 are used to limit two adjacent sides of the light bar 10 for positioning the light bar 10. Then, the positioned light bar 10 is fixed by the adsorption component 2, for ensuring the stable fixture and the flatness of the light bar 10, while preventing the light bar 10 from being displaced or bent. After that, the light guide plate 20 is covered on the flexible circuit board 110 included in the light bar 10, and the press component 4 is caused to slide along the guide rail 3 and press the light guide plate 20, so as to press the light guide plate 20 and the light bar 10 together, thereby realizing the assembly of the light bar 10 and the light guide plate 20. In this way, the assembly jig can improve the assembly efficiency of the light bar 10 and the light guide plate 20, while ensuring the yield of the assembled product.

In consideration of the structure of the above-mentioned light bar 10, the flexible circuit board 110 included in the light bar 10 has a circuit connector 130, and the circuit connector 130 usually protrude from the edge of the flexible circuit board 110. In this way, in order to facilitate the first limiting surface 102 to limit the light bar 10. for example, the first limiting surface 102 includes first and second sub-limiting surfaces arranged at intervals. Thus, when limiting the light bar 10, the circuit connector 130 can pass through the gap between the first sub-limiting surface and the second sub-limiting surface, thereby preventing the circuit connector 130 from hindering the limiting process to the light bar 10.

When the light guide plate 20 is covered on the light bar 10, in consideration of the structure of the above-mentioned light bar 10, the light guide plate 20 can be limited along the first direction O1 by the plurality of light-emitting units 120. If the side of the light bar 10 provided with the light-emitting units 120 is limited by the first limiting surface 102, then the light guide plate 20 is limited along the second direction O2 by the second limiting surface 103, thereby ensuring the alignment accuracy between the light bar 10 and the light guide plate 20, while ensuring a zero gap between the light bar 10 and the light guide plate 20.

It should be noted that the height of the second limiting surface 103 is equal to the sum of the thickness of the light guide plate 20 and the thickness of the flexible circuit board 110 included in the light bar 10. It is noted that the height of the second limiting surface 103 may also be slightly smaller than the sum of the thickness of the light guide plate 20 and the thickness of the flexible circuit board 110 included in the light bar 10, or greater than the sum of the thickness of the light guide plate 20 and the thickness of the flexible circuit board 110 included in the light bar 10, as long as the second limiting surface 103 can simultaneously limit the light bar 10 and the light guide plate 20 in position. The embodiments of the present disclosure are not limited in this regard.

When the height of the second limiting surface 103 is greater than the sum of the thickness of the light guide plate 20 and the thickness of the flexible circuit board 110 included in the light bar 10, in order to prevent the second limiting surface 103 from hindering the movement of the press component 4 when the press component 4 press the light guide plate 20 and the light bar 10 together, the second limiting surface 103 has a notch. The width of the notch is greater than or equal to the width of the press component 4.

Figure 3:
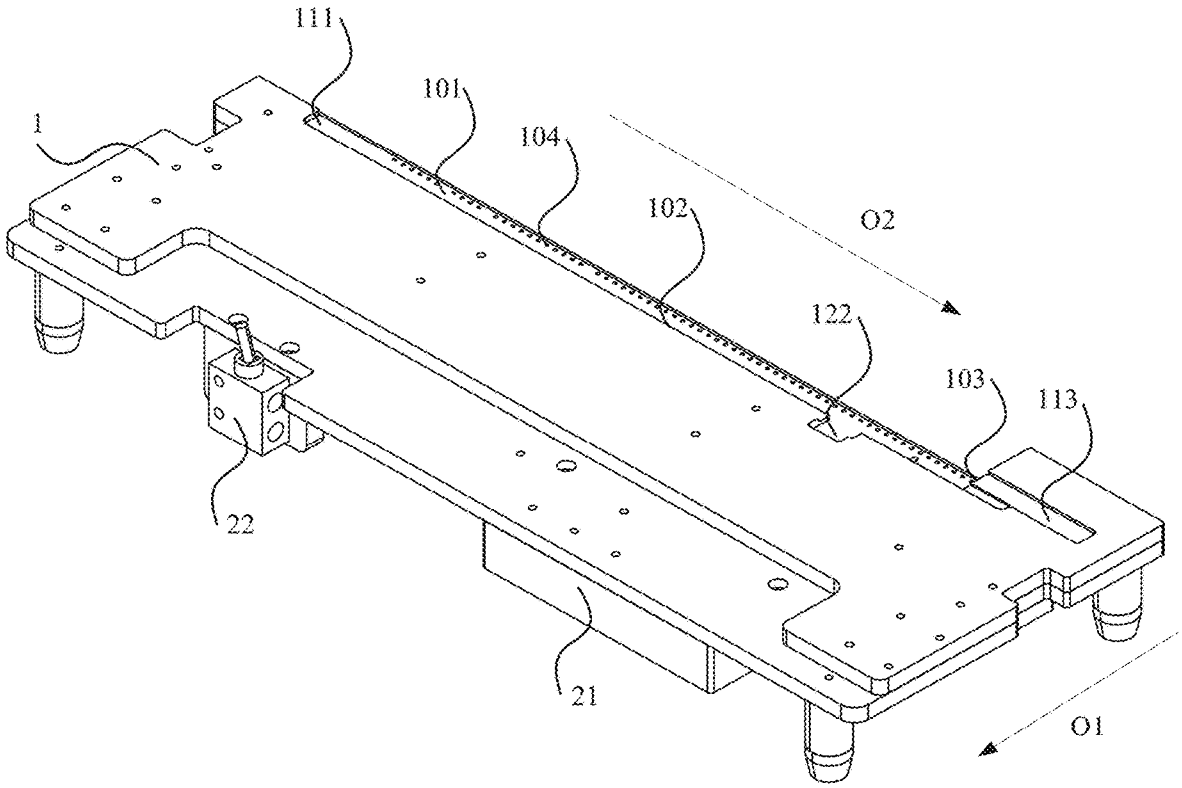
FIG. 3 is a schematic structural diagram of a bearing platform provided by an embodiment of the present disclosure.

In an embodiment of the present disclosure, the first limiting surface 102 and the second limiting surface 103 may be formed by the side walls of the groove 111. Specifically, as shown in FIG. 3, the platform body 11 has a groove 111 extending to the edge. The groove 111 has a side wall perpendicular to the first direction O1, and a side wall perpendicular to the second direction O2. The bottom surface of the groove 111 forms the carrying area 101. The side wall of the groove 111 perpendicular to the first direction O1 forms the first limiting surface, and the side wall perpendicular to the second direction O2 forms the second limiting surface. In this way, a side wall of the groove 111 that is perpendicular to the first direction O1, and a side wall that is perpendicular to the second direction O2, that is, two adjacent side walls of the groove 111, are used to realize the positioning of the components to be assembled and carried in the bearing area 101. The groove 111 may be a rectangular groove with one side open. In this case, the first limiting surface 102 and the second limiting surface 103 formed by the two adjacent side walls of the groove 111 are perpendicular to each other, and the first limiting surface 102 and the second limiting surface 103 as formed are both perpendicular to the surface of the bearing area 101.

It should be noted that, in conjunction with the above description, when the light bar 10 is limited through the two adjacent side walls of the groove 111, in order to avoid obstruction by the circuit connector 130 included in the light bar 10, the groove 111 is provided with a first avoidance groove 122 on a side wall perpendicular to the first direction O1; and in order to prevent the second limiting surface 103 from hindering the movement of the press component 4 when the press component 4 presses the light guide plate 20 and the light bar 10 together, the surface of the bearing platform 1 is provided with a second avoidance groove 113 extending to the groove 111 along the second direction O2.

In an embodiment of the present disclosure, in addition to forming the first limiting surface 102 and the second limiting surface 103 according to the above-mentioned embodiments, the first limiting surface 102 and the second limiting surface 103 may also be formed by using other methods.

Figure 4:
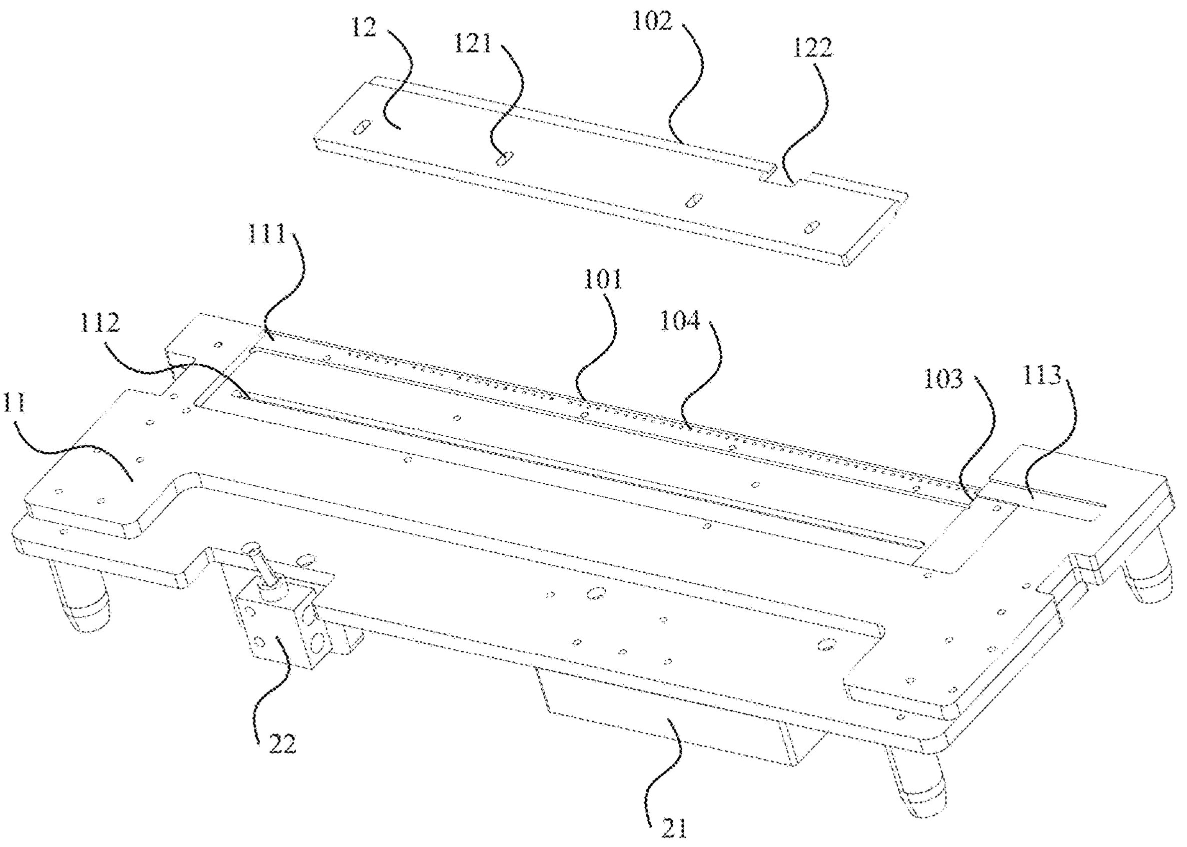
FIG. 4 is a schematic exploded structural diagram of a bearing platform provided by another embodiment of the present disclosure.

As for the first limiting surface 102, as shown in FIG. 4, the bearing platform 1 includes a platform body 11 and a first limiting structure 12. The first limiting structure 12 is limited on the side of the bearing area 101 along the first direction O1. The first limiting structure 12 has a first limiting surface 102.

The first limiting structure 12 may be a strip-shaped structure extending along the second direction O2, so that the first limiting surface 102 of the first limiting structure 12 can increase the limiting area. In combination with the above description, when the light bar 10 is limited by the first limiting structure 12, in order to avoid obstruction by the circuit connector 130 included in the light bar 10, as shown in FIG. 4, the first limiting structure 12 has a first avoidance groove 122. or the first limiting structure 12 includes a first sub-limiting structure and a second sub-limiting structure that are spaced apart.

For the second limiting surface 103, the platform body 11 has a groove 111 extending to the edge, and the groove 111 has a side wall perpendicular to the second direction. The bottom surface of the groove 111 forms the bearing area 101, and the side of the groove 111 being perpendicular to the second direction forms the second limiting surface 103. Alternatively, the bearing platform 1 further includes a second limiting structure. The second limiting structure is limited on the platform body 11, and is located on the side of the bearing area 101 along the first direction. The second limiting structure has a second limiting surface 103.

The second limiting structure may be a strip-shaped structure extending along the second direction O2. When the components to be assembled are limited by the side wall of the groove 111 being perpendicular to the second direction O2 or the second limiting structure, in order to avoid the side wall of the groove 111 and the second limiting structure from hindering the movement of the press component 4, the surface of the platform body 11 and the second limiting structure are provided with second avoidance grooves 113 extending along the second direction O2. For example, in the case of limiting by the side wall of the groove 111, as shown in FIG. 4, the surface of the platform body 11 has a second avoidance groove 113 extending to the groove 111 along the second direction O2.

In an embodiment of the present disclosure, for the above-mentioned situation where the first limiting surface 102 is formed by the first limiting structure 12, when the components to be assembled are limited by the first limiting structure 102, in order to facilitate the assembly jig to carry components to be assembled of different sizes, the position of the first limiting structure 12 along the first direction O1 is adjustable, or the position along the second direction O2 is adjustable, or the position along the first direction O1 and the position along the second direction O2 are both adjustable. In this way, after adjusting the position of the first limiting structure 12, the area size of the bearing area 101 can be adjusted, thereby accomplishing the positioning of components to be assembled of different sizes in the bearing area 101.

When the position of the first limiting structure 12 along the first direction O1 is adjustable, the platform body 11 has a first slide groove 112 extending along the second direction, and the bearing platform 1 also includes a first limiting rod (not shown in the figures). One end of the first limiting rod passes through the first slide groove 112, and is in a limiting connection with the first limiting structure 12. The other end of the first limiting rod is detachably limited on the side of the platform body 11 away from the first limiting structure 12.

The first limiting rod is a bolt with a head. At this time, the threaded end of the bolt passes through the first slide groove 112, and is in a limiting connection with the first limiting structure 12. At this time, the bolt achieves the limiting effect based on the friction with the bearing platform 1. When the limiting connection between the bolt and the first limiting structure 12 is loosened, the movement of the bolt along the first slide groove 112 can be realized, thereby driving the first limiting structure 12 to move synchronously.

When adjusting the position of the first limiting structure 12, the other end of the first limiting rod may be detached from being limited on one side of the platform body 11, then the first limiting rod may slide along the first slide groove 112, and the first limiting structure 12 slides along the second slide groove 121 relative to the first limiting rod. After completing the position adjustment of the first limiting structure 12, the other end of the first limiting rod is re-limited on the side of the platform body 11. It is noted that the above structure can also satisfy the position adjustment of the first limiting structure 12 alone along the first direction O1, or the position adjustment alone along the second direction O2. The specific adjustment details can refer to the above adjustment methods, and the embodiments of the present disclosure are not limited in this regard.

When the position of the first limiting structure 12 along the second direction O2 is adjustable, the first limiting structure 12 has a second slide groove 121 extending along the first direction, and the bearing platform 1 further includes a second limiting rod (not shown in the figures). One end of the second limiting rod passes through the second slide groove 121, and is in a limiting connection with the platform body 11. The other end of the second limiting rod is detachably limited on the side of the first limiting structure 12 away from the platform body 11.

The structure of the second limiting rod can refer to the structure of the first limiting rod described above, and the principle of position adjustment of the first limiting structure 12 along the second direction O2 can refer to the principle of position adjustment of the above-mentioned first limiting structure 12 along the second direction O2. The embodiments of the present disclosure are not limited in this regard.

When the position of the first limiting structure 12 is adjustable along both the first direction O1 and the second direction O2, as shown in FIG. 4, the platform body 11 has a first slide groove 112 extending along the second direction O2, the first limiting structure 12 has a second slide groove 121 extending along the first direction O1, and the bearing platform 1 further includes a third limiting rod. One end of the third limiting rod passes through the first slide groove 112 and the second slide groove 121. One end of the third limiting rod is in a detachably limiting connection with the first limiting structure 12, and the other end of the third limiting rod is in a detachably limiting connection with the platform body 11.

The structure of the third limiting rod may refer to the above-mentioned first limiting rod. The principle of position adjustment of the first limiting structure 12 along the first direction O1 and the second direction O2 may refer to the above-mentioned adjustment principle of the first limiting structure along the first direction O1. The embodiments of the present disclosure are not limited in this regard. For example, the third limiting rod is a stud bolt, and both ends of the third limiting rod are in a detachably limiting connection with the platform body 11 and the first limiting structure 12 respectively through corresponding nuts.

Regarding the above-mentioned situation in which the second limiting surface 103 is formed by the second limiting structure, when the components to be assembled are limited by the second limiting structure, in order to facilitate the bearing area to carry components to be assembled of different sizes, the position of the second limiting structure in the second direction O2 is adjustable, and/or the position in the first direction O1 is adjustable.

In this way, the area size of the bearing area can be adjusted by adjusting the position of the second limiting structure, so that components to be assembled of different sizes can be positioned in the bearing area. For the case where the position of the second limiting structure is adjustable, references may be made to the above-mentioned position adjustment of the first limiting structure 12, which will not be described again in the embodiments of the present disclosure.

In an embodiment of the present disclosure, the components to be assembled and carried in the bearing area 101 can be fixed by vacuum adsorption, which can simplify the operation, improve the fixing efficiency, and make the components to be assembled flat.

In some embodiments, as shown in FIG. 3 or FIG. 4, the adsorption component 2 includes a vacuum generator 21, and the suction end of the vacuum generator 21 is in communication with a plurality of adsorption holes 104. In this way, after the components to be assembled are positioned through the first limiting surface 102 and the second limiting surface 103, the vacuum generator 21 may be started. At this time, the plurality of adsorption holes 104 may generate negative pressures to achieve adsorption and fixture of the components to be assembled.

As shown in FIG. 3 or 4, the adsorption component 2 also includes an air source switch 22. One end of the air source switch 22 is in communication with the air inlet end of the vacuum generator 21, and the other end of the air source switch 22 is used to communicate with the air compressor. In this way, when the air source switch 22 is in an on state, the air compressor may provide high-pressure gas to the air inlet end of the vacuum generator 21, so that the suction end of the vacuum generator 21 sucks the gas, and the vacuum generator 21 is started, thus rendering it easier for the operator to operate.

In some embodiments, the adsorption component 2 further includes a plurality of regulating valves. The first ends of the plurality of regulating valves are all connected to the suction end of the vacuum generator 21, and the second end of each regulating valve is in communication with at least one adsorption hole 104. In this way, the negative pressure of each adsorption hole 104 can be adjusted through the plurality of regulating valves, thereby avoiding the situation where the negative pressure of some adsorption hole 104 is too large, causing wrinkles in the components to be assembled.

Figure 5:
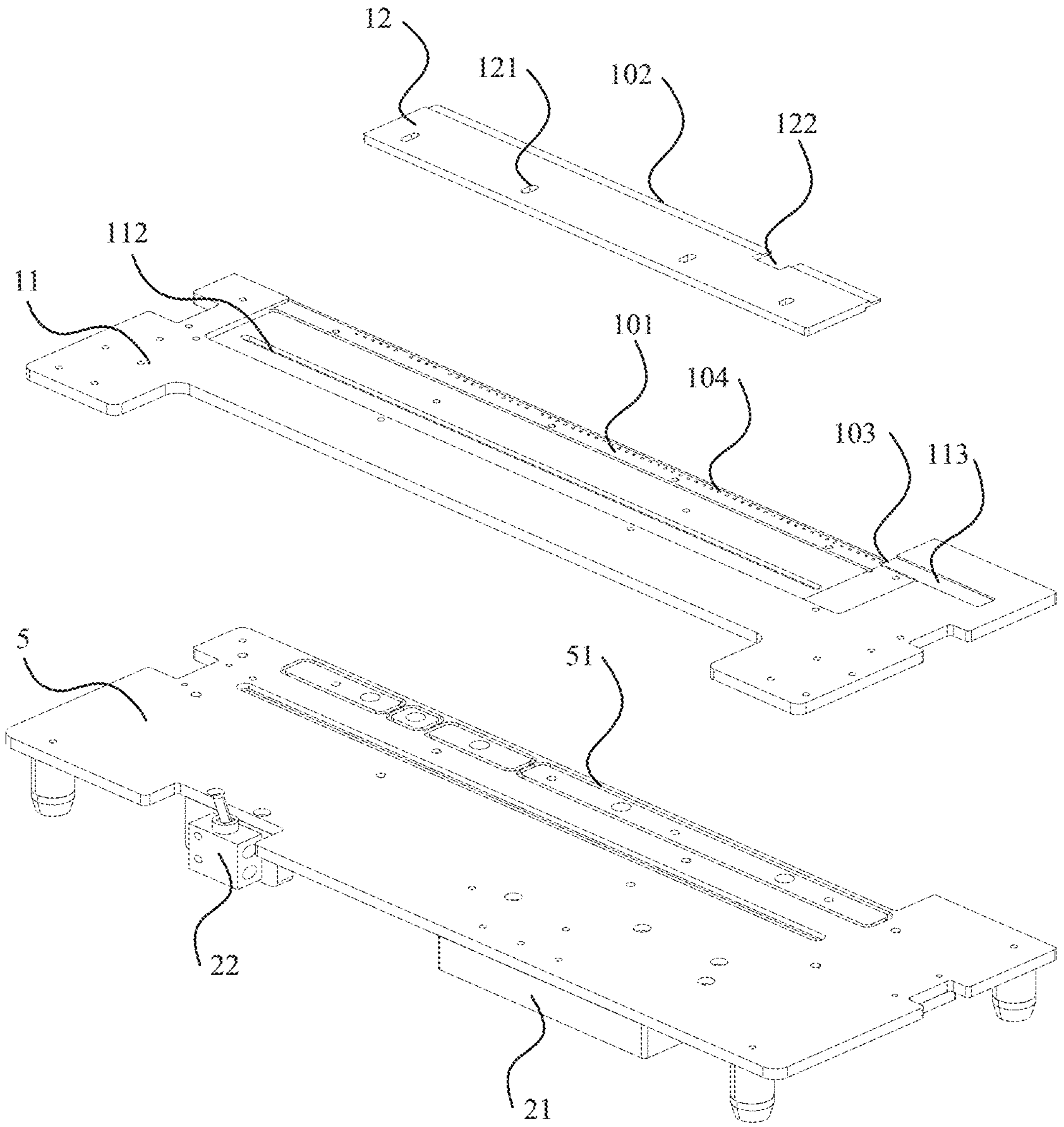
FIG. 5 is a schematic exploded structural diagram of a bearing platform connected to a base provided by an embodiment of the present disclosure.

In some embodiments, as shown in FIG. 5, the assembly jig also includes a base 5. The base 5 has a plurality of air channels 51 corresponding to the plurality of regulating valves in a one-to-one correspondence. The base 5 is located on the side of the bearing platform 1 away from the bearing area 101 (that is, the bearing platform 1 is fixed on the base 5, and the bearing area 101 is located on the side away from the base 5). Each air channel 51 is in communication with at least one adsorption hole 104, and each air channel 51 is in communication with the second end of the corresponding regulating valve.

In this way, communication between a regulating valve and at least one adsorption hole 104 can be achieved through the air channel 51 provided on the base 5, thus simplifying the connection process between at least one adsorption hole 104 and a corresponding regulating valve. For example, one regulating valve is in communication with five adsorption holes 104 through the corresponding air channel 51, thereby avoiding the need to provide five communication pipes between the regulating valve and the five adsorption holes 104.

It is noted that in an embodiment of the present disclosure, in addition to the vacuum generator 21, the adsorption component 2 may also be a vacuum suction cup, so that the light bar 10 can be adsorbed and fixed through the vacuum suction cup. The vacuum suction cup is fixed in the adsorption hole 104. The specific principle for the vacuum suction cup to adsorb and fix the components to be assembled can refer to related technologies, and the embodiments of the present disclosure are not limited in this regard.

Figure 6:
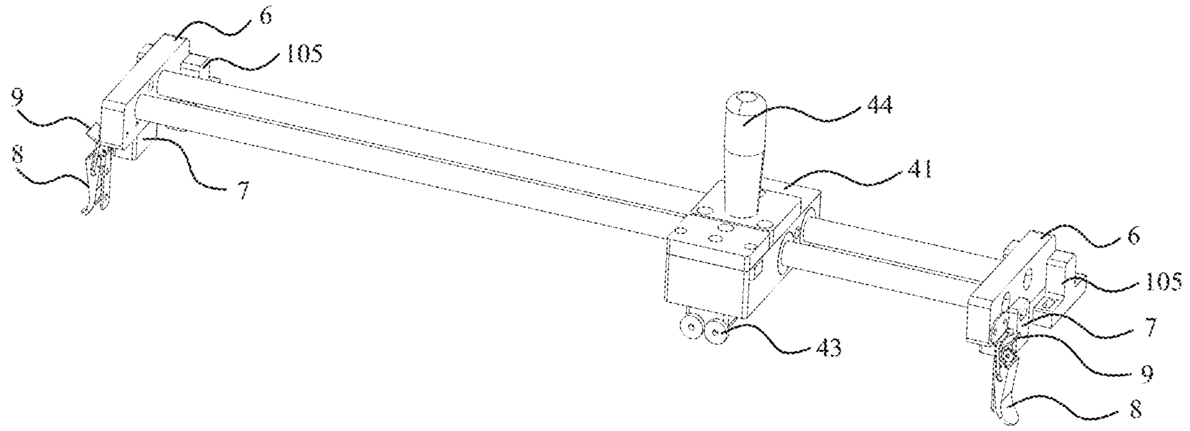
FIG. 6 is a schematic structural diagram of a press component and a guide rail in a limiting mode provided by an embodiment of the present disclosure.
Figure 7:
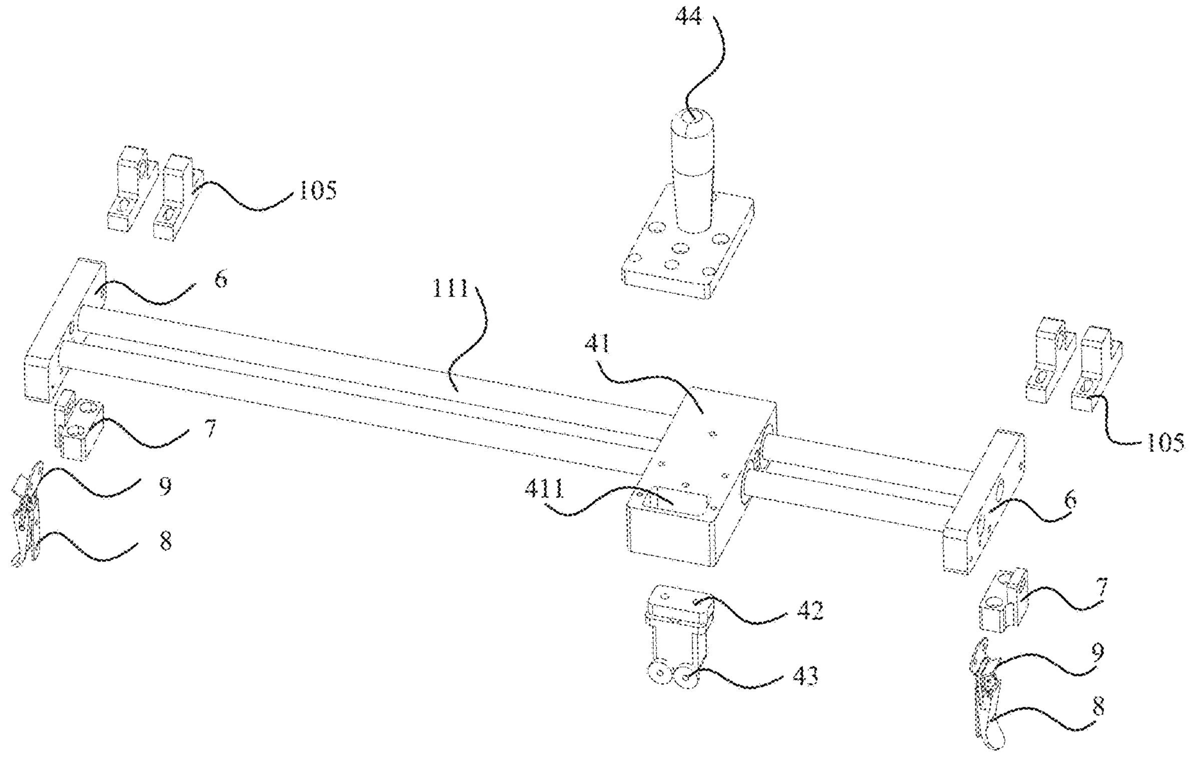
FIG. 7 is a schematic exploded structural diagram of a press component and a guide rail in a limiting mode provided by an embodiment of the present disclosure.

In some embodiments, as shown in FIGS. 6 and 7, the press component 4 includes a slide block 41, a connection block 42, and a press body 43. The slide block 41 is slidably limited on the guide rail 3. The connection block 42 and the slide block 41 are in a limiting connection. The press body 43 is limited on the connection block 42. When the slide block 41 slides, the orthographic projection of the press body 43 on the bearing platform 1 is located in the bearing area 101, and there is a gap between the press body 43 and the surface of the bearing area 101.

The press body 43 is a press roller or a press block. When the press body 43 is a press roller, the press roller is rotatably limited on the connection block 42. In this way, when the two components to be assembled are pressed together by the press roller, the friction between the press roller and the components can be reduced based on the press roller's own rotation.

The press roller is made of non-rigid material to avoid hard contact when pressing the components to be assembled. For example, the material of the press roller is silica gel. The press component 4 includes a plurality of press rollers, and the axes of the plurality of press rollers are parallel. In some embodiments, the plurality of press rollers are distributed along the length direction of the guide rail 3, that is, along the second direction O2, so as to ensure the press effect of the press rollers on the components to be assembled. In other embodiments, the plurality of press rollers are distributed along the direction perpendicular to the length direction of the guide rail 3, that is, along the first direction O1. This can increase the press area of the components to be assembled by the press rollers. In some embodiments, the plurality of press rollers are distributed in a matrix along the first direction O1 and the second direction O2. This can not only ensure the press effect of the press rollers on the components to be assembled, but also increase the press area of the press rollers on the components to be assembled.

In some embodiments, the distance between the press body 43 and the surface of the bearing area 101 is not adjustable, and at this time, the connection block 42 and the slide block 41 are fixedly connected. For example, as shown in FIG. 7, the slide block 41 has a limiting hole 411, and at least part of the connection block 42 is limited in the limiting hole 411.

The connection block 42 may be in a direct limiting connection with the slide block 41. It is noted that as shown in FIG. 6 or FIG. 7, the press component 4 includes an armrest 44, and the armrest 44 is fixedly connected to the slide block 41. At this time, the connection block 42 may be in a limiting connection with the armrest 44. That is, the connection block 42 extends into the limiting hole 411 and is in a limiting connection with the armrest 44.

During the use of the assembly jig, for components to be assembled with different thicknesses, the gap between the press body 43 and the surface of the bearing area 101 needs to be adjusted. At this time, the adjustment can be accomplished by replacing the press body 43 with different sizes. In order to facilitate the later replacement of the press body 43, that is, to facilitate the detaching of the connection block 42 and the slide block 41 or the armrest 44 (the connection block 42 and the slide block 41, or the connection block 42 and the armrest 44 are detachably and fixedly connected). In some embodiments, as shown in FIG. 6 or FIG. 7, the assembly jig also includes a rotating block 6, a limiting block 7, a buckle 8, and a hook 9. The bearing platform 1 is provided with a support seat on the side of the bearing area 101. One end of the rotating block 6 is rotatably limited on the support seat 105. The end of the guide rail 3 is fixed on the rotating block 6. The limiting block 7 is fixed on the bearing platform 1, and is located on the side of the support seat 105 close to the bearing area 101. The distance between the limiting block 7 and the support seat 105 is less than the length of the rotating block 6. The buckle 8 is fixed on the bearing platform 1, the hook 9 is fixed on the other end of the rotating block 6, and when the rotating block 6 is supported on the limiting block 7, the buckle 8 is connected to the hook 9.

In this way, when replacing the press body 43, the connection between the buckle 8 and the hook 9 is disconnected, and then the rotating block 6 is rotated to drive the guide rail 3 to rotate synchronously. At this time, the guide rail 3 drives the slide block 41 to rotate synchronously, so that the distance between the press body 43 and the bearing platform 1 is increased, thereby facilitating the detaching of the connection block 42 and the slide block 41 or the armrest 44. After the replacement is completed, the rotating block 6 is rotated in an opposite direction, so as to prevent the angle between the rotating block 6 and the bearing platform 1 from being too small under the limiting effect by the limiting block 7, and at the same time ensure that a predetermined gap exists between the press body 43 and the surface of the bearing area 101. Then, the buckle 8 and the hook 9 are engaged to achieve the fixation of the rotating block 6.

In other embodiments, the distance between the press body 43 and the surface of the bearing area 101 is adjustable. In this way, when pressing and guiding the components to be assembled, the distance between the press body 43 and the surface of the bearing area 101 can be adjusted for the components to be assembled with different thicknesses, thereby facilitating the press of components to be assembled with different thicknesses and improving the suitability of the assembly jig. In addition, by adjusting the distance between the press body 43 and the surface of the bearing area 101, the press force of the components to be assembled can be adjusted, thereby ensuring the press tightness between the two components to be assembled.

In some embodiments, the press component 4 also includes an elastic member and a connection member. Both ends of the connection member are threadedly connected to at least one of the slide block 41 and the connection block 42 respectively, and the elastic member is clamped between the slide block 41 and the connection block 42.

The elastic member may be a compression spring, and the connection member may be a bolt. In this way, the bolt may be loosened to adjust the distance between the slide block 41 and the connection block 42 to become larger, or the bolt may be tightened to adjust the distance between the slide block 41 and the connection block 42 to become smaller. After the distance between the slide block 41 and the connection block 42 is adjusted, the compression spring may extend or shorten based on its own elastic force, so as to ensure that the relative positions between the slide block 41 and the connection block 42 are constant.

It is noted that in an embodiment of the present disclosure, in addition to adjusting the distance between the press body 43 and the surface of the bearing area 101 in the above-described embodiments, the distance between the press body 43 and the surface of the bearing area 101 may also be adjusted in other ways. For example, when the press component 4 includes an armrest, the distance between the connection block 42 and the armrest 44 is adjustable, thereby realizing the adjustment of the distance between the press body 43 and the surface of the bearing area 101. The embodiments of the present disclosure are not limited in this regard.

Other embodiments of the present disclosure will be readily apparent to those skilled in the art from consideration of the specification and practice of the contents disclosed herein. The present application is intended to cover any variations, uses, or adaptations of the present disclosure that follow the general principle of the present disclosure and include common knowledge or customary technical means in the technical field that are not disclosed in the present disclosure. It is intended that the specification and examples be considered as exemplary only, with the true scope and spirit of the present disclosure being indicated by the following claims.

The invention claimed is:

1. An assembly jig, comprising:

a bearing platform, having a bearing area, a first limiting surface, a second limiting surface, and a plurality of adsorption holes penetrating the bearing platform in the bearing area, wherein the first limiting surface is located on a side of the bearing area along a first direction, the second limiting surface is located on a side of the bearing area along a second direction, and the first direction intersects with the second direction;

an adsorption component, being in communication with the plurality of adsorption holes and configured to form a negative pressure in the adsorption holes;

a guide rail, limited on the bearing platform and provided on a side where the bearing area is located, wherein a length direction of the guide rail is parallel to the second direction; and a press component, slidably limited on the guide rail and having a press surface towards the bearing area, wherein when the press component slides, an orthographic projection of the press surface on the bearing platform is located in the bearing area, and a gap exits between the press surface and a surface of the bearing area.

2. The assembly jig according to claim 1, wherein the bearing platform comprises a platform body and a first limiting structure; and the first limiting structure is limited on the side of the bearing area along the first direction, and the first limiting structure has the first limiting surface.

3. The assembly jig according to claim 2, wherein the platform body has a first slide groove extending along the second direction, and the bearing platform further comprises a first limiting rod; and one end of the first limiting rod passes through the first slide groove and is in a limiting connection with the first limiting structure, and the other end of the first limiting rod is detachably limited on a side of the platform body away from the first limiting structure.

4. The assembly jig according to claim 2, wherein the first limiting structure has a second slide groove extending along the first direction, and the bearing platform further comprises a second limiting rod; and one end of the second limiting rod passes through the second slide groove and is in a limiting connection with the platform body, and the other end of the second limiting rod is detachably limited on a side of the first limiting structure away from the platform body.

5. The assembly jig according to claim 2, wherein the platform body has a groove extending to an edge, and the groove has a side wall perpendicular to the second direction; and a bottom surface of the groove forms the bearing area, and the side wall of the groove perpendicular to the second direction forms the second limiting surface.

6. The assembly jig according to claim 2, wherein the bearing platform further comprises a second limiting structure;

the second limiting structure is limited on the platform body and is located on the side of the bearing area along the first direction; and the second limiting structure has the second limiting surface.

7. The assembly jig according to claim 2, wherein the adsorption component comprises a vacuum generator and a plurality of regulating valves; and a first end of each regulating valve is in communication with a suction end of the vacuum generator, and a second end of each regulating valve is in communication with at least one of the adsorption holes.

8. The assembly jig according to claim 2, wherein the press component comprises a slide block, a connection block, and a press body;

the slide block is slidably limited on the guide rail, the connection block is in a limiting connection with the slide block, and the press body is limited on the connection block; and when the slide block slides, an orthographic projection of the press body on the bearing platform is located in the bearing area, and a gap exits between the press body and the surface of the bearing area.

9. The assembly jig according to claim 1, wherein the adsorption component comprises a vacuum generator and a plurality of regulating valves; and a first end of each regulating valve is in communication with a suction end of the vacuum generator, and a second end of each regulating valve is in communication with at least one of the adsorption holes.

10. The assembly jig according to claim 9, wherein the assembly jig further comprises a base, and the base has a plurality of air channels corresponding to the plurality of regulating valves in a one-to-one correspondence; and the base is located on a side of the bearing platform away from the bearing area, each air channel is in communication with at least one of the adsorption holes, and each air channel is in communication with the second end of a respective regulating valve.

11. The assembly jig according to claim 1, wherein the press component comprises a slide block, a connection block, and a press body;

the slide block is slidably limited on the guide rail, the connection block is in a limiting connection with the slide block, and the press body is limited on the connection block; and when the slide block slides, an orthographic projection of the press body on the bearing platform is located in the bearing area, and a gap exits between the press body and the surface of the bearing area.

12. The assembly jig according to claim 11, wherein the slide block has a limiting hole, and at least part of the connection block is limited in the limiting hole.

13. The assembly jig according to claim 12, wherein the press component comprises an armrest, the armrest is fixedly connected with the slide block, and the connection block extends into the limiting hole and is fixedly connected with the armrest.

14. The assembly jig according to claim 13, wherein the connection block is detachably and fixedly connected to the slide block, and the assembly jig further comprises a rotating block, a limiting block, a buckle, and a hook;

the bearing platform is provided with a support seat on a side of the bearing area, one end of the rotating block is rotatably limited on the support seat, and an end of the guide rail is fixed on the rotating block;

the limiting block is fixed on the bearing platform and is located on a side of the support seat close to the bearing area, and a distance between the limiting block and the support seat is less than a length of the rotating block; and the buckle is fixed on the bearing platform, the hook is fixed on the other end of the rotating block, and the buckle is connected to the hook when the rotating block is supported on the limiting block.

15. The assembly jig according to claim 12, wherein the connection block is detachably and fixedly connected to the slide block, and the assembly jig further comprises a rotating block, a limiting block, a buckle, and a hook;

the bearing platform is provided with a support seat on a side of the bearing area, one end of the rotating block is rotatably limited on the support seat, and an end of the guide rail is fixed on the rotating block;

the limiting block is fixed on the bearing platform and is located on a side of the support seat close to the bearing area, and a distance between the limiting block and the support seat is less than a length of the rotating block; and the buckle is fixed on the bearing platform, the hook is fixed on the other end of the rotating block, and the buckle is connected to the hook when the rotating block is supported on the limiting block.

16. The assembly jig according to claim 11, wherein a gap between the press body and the surface of the bearing area is adjustable.

17. The assembly jig according to claim 16, wherein the press component further comprises an elastic member and a connection member; and both ends of the connection member are threadedly connected to at least one of the slide block and the connection block respectively, and the elastic member is clamped between the slide block and the connection block.

18. The assembly jig according to claim 11, wherein the press body is a press roller, and the press roller is rotatably limited on the connection block.

19. The assembly jig according to claim 18, wherein the press component comprises a plurality of press rollers, and the plurality of press rollers are axially parallel and distributed along the length direction of the guide rail.

20. The assembly jig according to claim 1, wherein the bearing area is configured to carry a light bar, the first limiting surface and the second limiting surface are configured to limit two adjacent sides of the light bar, the adsorption component is configured to fix the light bar, and the press component is configured to press a light guide plate covering the light bar when sliding along the guide rail.

* * * * *